United States Patent
Sirbu

(10) Patent No.: US 7,062,680 B2
(45) Date of Patent: Jun. 13, 2006

(54) EXPERT SYSTEM FOR PROTOCOLS ANALYSIS

(75) Inventor: Mihai Sirbu, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 567 days.

(21) Appl. No.: 10/295,870

(22) Filed: Nov. 18, 2002

(65) Prior Publication Data

US 2004/0098641 A1 May 20, 2004

(51) Int. Cl.
G06F 11/00 (2006.01)

(52) U.S. Cl. .......................................... 714/39; 714/18

(58) Field of Classification Search ................ 714/39, 714/49, 18, 748; 709/224; 370/466, 467
See application file for complete search history.

(56) References Cited

U.S. PATENT DOCUMENTS

| 6,708,292 B1 * | 3/2004 | Mangasarian ................ 714/39 |
| 6,781,991 B1 * | 8/2004 | Anderlind .................... 370/394 |
| 6,928,587 B1 * | 8/2005 | Gernhardt ..................... 714/39 |
| 6,931,574 B1 * | 8/2005 | Coupal et al. ................ 714/39 |
| 2001/0029499 A1 * | 10/2001 | Tuatini et al. ................ 706/47 |
| 2002/0004829 A1 * | 1/2002 | Yasunami .................... 709/224 |
| 2003/0195958 A1 * | 10/2003 | Byron et al. ................ 709/224 |
| 2004/0100972 A1 * | 5/2004 | Lumb et al. ................ 370/401 |

* cited by examiner

Primary Examiner—Dieu-Minh Le
(74) Attorney, Agent, or Firm—Abdul Zindani; W. James Brady, III; Frederick J. Telecky, Jr.

(57) ABSTRACT

An expert system that provides an analysis of protocol exchanges and protocol relationships across multiple data units, such as packets, of a network and within data units themselves is described. The system collects a number of facts and based on rules governing the data units, new rules and facts are gained from the analysis. The invention is extensible for additional protocols and diagnostics by updating a knowledge database with dynamic rules for any application or protocol desired.

20 Claims, 3 Drawing Sheets

EXPERT SYSTEM FOR PROTOCOLS ANALYSIS

CROSS-REFERENCE TO RELATED APPLICATIONS

None

CROSS-REFERENCE TO RELATED APPLICATIONS

Not applicable.

FIELD OF THE INVENTION

The present invention relates generally to protocol analyzing systems for a network, and more particularly for adding an expert system onto a network analyzer in a communications network to analyze protocol compliance within a protocol data unit, such as a packet, and analyze relationships across multiple protocol data units.

BACKGROUND OF THE INVENTION

Digital communication systems where information is transmitted in data packages between a header and trailer are generally known as packet networks. Packets sent over a packet network are defined by a set of rules called protocols. A packet or frame typically includes some type of data or information in between a header and a trailer. Protocols analyzers connect to the communications bus of a packet network and collect and store information relating to the packets that are traveling on the bus. Typical types of information include the origin and type of packet, the number of bits in the frame, a timestamp, the destination address of the packet, and other information. This information is useful for network engineers in determining equipment requirements, the source of network problems, and in supervision and maintenance of a network.

Computer networks, such as local area networks (LANs), can use different protocols to send and receive data. Switched-packet networks use individual packets or frames of data that are routed individually through a network from a source to a destination. Each packet is comprised a number of layers of protocol headers and data, for one or more network protocols. Packets conforming to the network protocol must have elements that satisfy the defined data values at their respective offsets.

Network protocol analyzers, referred to colloquially as network "sniffers," are helpful for network operations to capture and inspect packets as they travel through a particular location on the network. Packet inspections are performed in order to determine the quantities, distributions, and other parameters and protocols for packets. Analyzers capture and decode packets traveling between network hardware components. Packet details can be viewed to help isolate network problems and provide information on network traffic flow and monitoring. Some examples of network monitoring include traffic congestion, runaway traffic, traffic from each station or server, percent of bandwidth for a particular protocol, and isolation of traffic patterns. Protocol analyzers can capture packets in real time for immediate evaluation or save packets for a buffered analysis time, such as a first-in first-out buffer.

A network protocol must deterministically define the structure of packets formed according to the protocol. A protocol will define precisely the contents of a packet typically using a number of fields. Each field has a known offset from either the start of the packet or the start of the previous field. Offsets may be in bytes, bits, octets, or other units. For example, the specific order of the fields is defined, each field being followed by a specifically defined set of possible fields, each field have a specifically defined value or set of possible values.

Conventional protocol analyzers use microprocessors programmed by software to collect and store the packet information. However, systems cannot keep pace with high-speed network and data systems, therefore many systems resort to sampling data streams instead of analyzing each element of data. For example, the analyzer in U.S. Pat. No. 6,304,903 uses an input buffer, lookup table, and counter memory running in content addressable memory and random access memory for analyzing at least a portion of packets in a state machine. Some network analyzers use pattern matching to compare stored data for network protocols defining an FTP packet including an Internet Protocol ("IP") address with the capered data from the network. Patterns of matching criteria are applied to a captured packet wherein the packet is scanned a number of times, equaling the number of matching criteria patterns. This process is resource intensive and typically cannot track every packet in network traffic. The protocol analyzers in U.S. Pat. No. 5,916,301 process data communications packets to determine whether they match network protocols using a parser table and a predictive parser.

The protocol analyzers in the prior art are based on comparing packet information with some type of lookup table or protocol database where the rules for packets are pre-defined for protocols or network management statistics, for example comparing whether a data element is a "match" to a particular network protocol. The rules are not dynamically changed to compare information, including protocols, between incoming packets in a transmission. Current analyzers only display message components and do not look at relationships across multiple packets. Therefore, there is a need for a network protocol analyzer that analyzes relationships across multiple packets and within individual packets to determine errors in a protocol-based transmission.

SUMMARY

The invention is network protocol analyzer for capturing and analyzing network data, such as packets, that are being transmitted during a protocol exchange session. The analyzer comprises a network interface that is connected to a network, an expert system that gathers and extracts protocol and other information from packets, a packet storage area for storing packets and extracted information, and interfaces for either a direct interface from a user or connection to an external computer. The expert system performs provides an analysis of protocol exchanges and protocol relationships across multiple packets and within packets themselves.

The invention provides more than a simple packet validation, it performs a validation of an entire protocol exchange between two or more hardware devices on a network. Each captured packet from a protocol exchange can include facts such as an IP routing header and sequence numbers, in addition the packet contains rules governing the protocol exchange such as protocol headers, messages, and redundancy checks. The system collects a number of facts and rules from the packets in a rule database and fact database, respectively. The databases contain programmed information based on existing protocols, such as H.323, as well as dynamic rules generated from packet components, such as an IP header. A protocol analysis engine analyzes the information components extracted from the captured packets for comparison matching on individual packets and across multiple packets to one or more protocols. The invention is extensible for additional protocols and diagnostics by updating a knowledge database with dynamic rules for any application or protocol desired.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EMBODIMENTS

There is described herein a preferred exemplary embodiment for adding an expert system for protocol analysis ("expert system") onto a network protocol analyzer. The expert system determines errors in network transmissions by analyzing relationships across multiple protocol data units and within data units being transmitted over network lines. The preferred embodiment is applied to a packet based network. However, as one skilled in the art would recognize, the present invention can be applied to other network types, such as asynchronous transfer mode, or frame relay.

Figure 1:
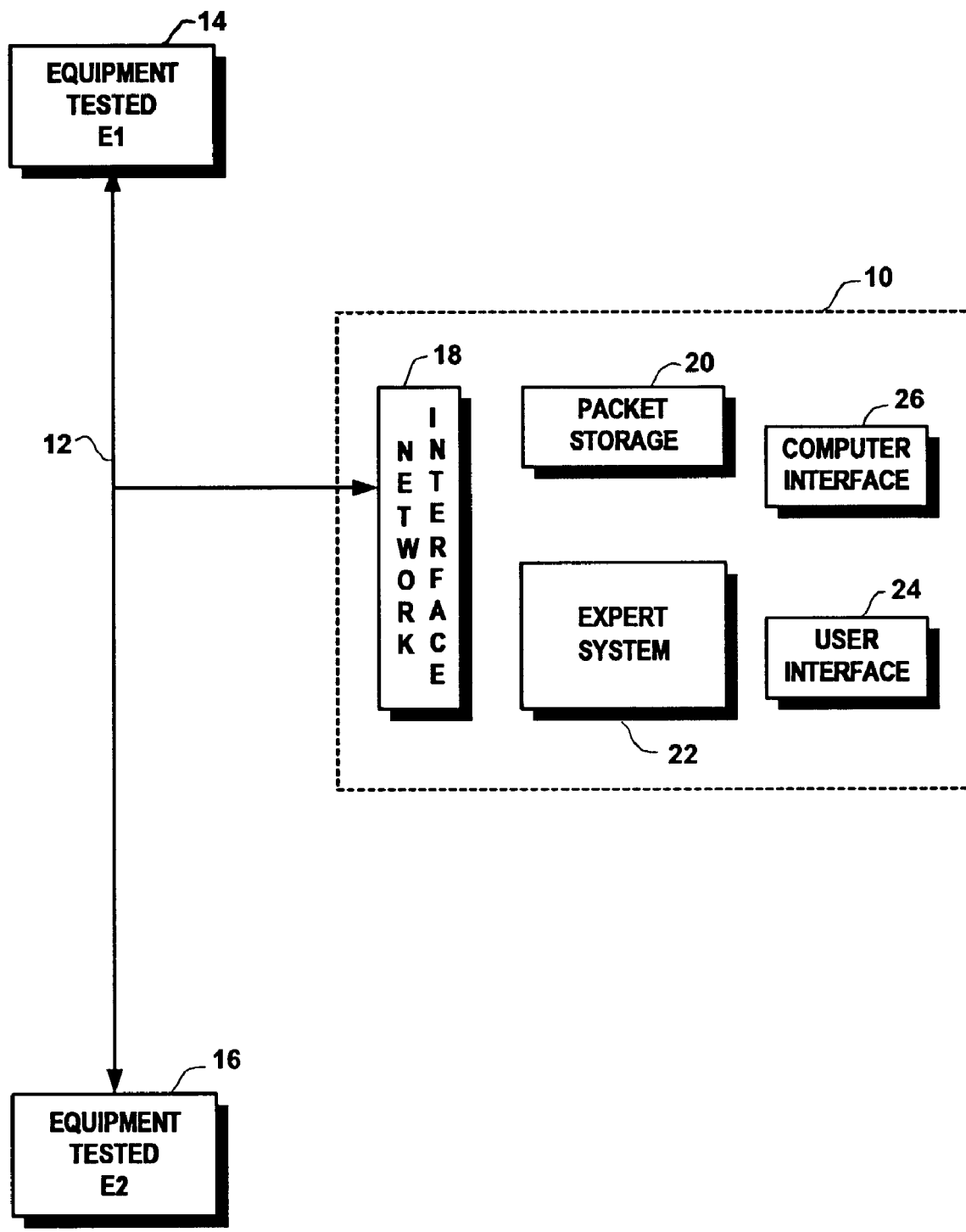
FIG. 1 is an illustration of an expert system for protocol analysis.

Referring to FIG. 1, there is illustrated an expert system for protocol analysis. The analyzer system 10 is coupled to a conventional packet-based network 12 through a network interface 18 and captures all or part of the traffic passing on the network 12 between hardware box E1 14 and hardware box E2 16. The system includes a packet storage 20, the expert system engine 22, and interfaces to communicate either with a user 24 and or a computer 26. Processing of captured packets can be performed either in real time or from stored packets accessed in packet storage 20. The system can be implemented with an integrated circuit, a dedicated microprocessor, or a general purpose computer. The operation of the expert system is described in below with reference to FIGS. 2 and 3.

Figure 2:
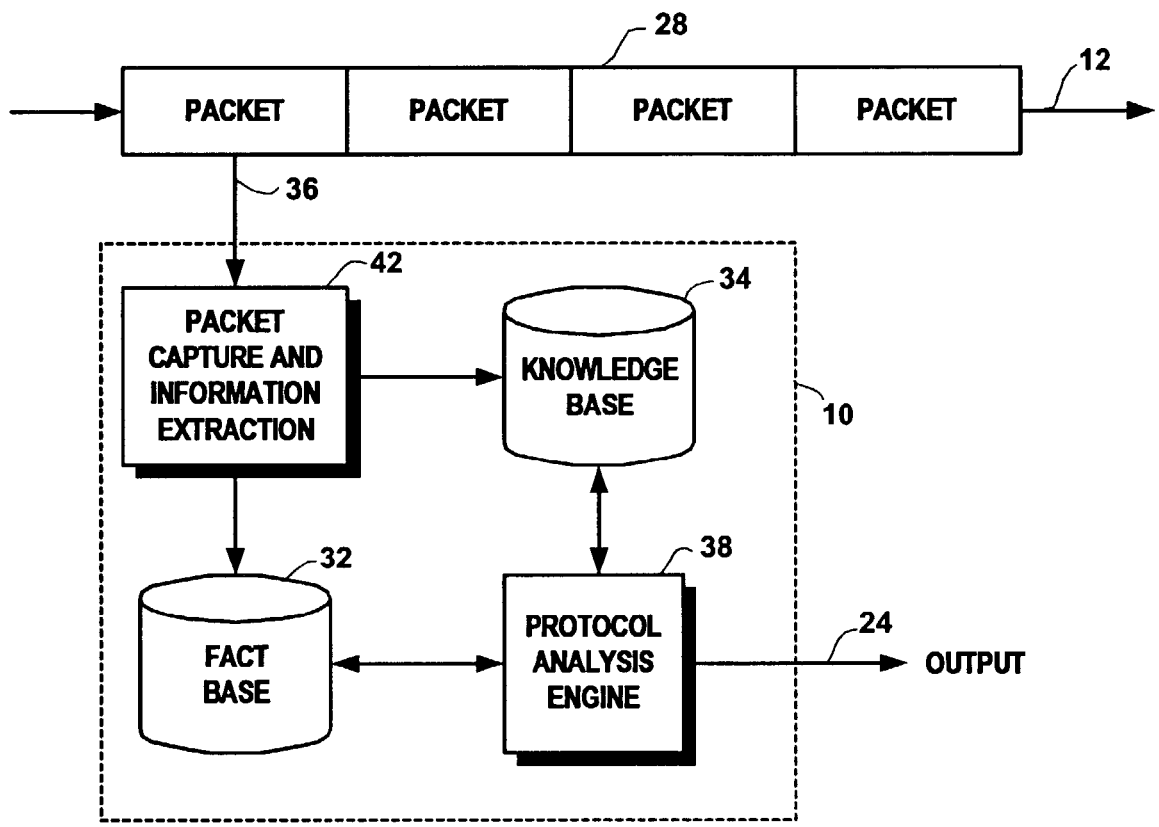
FIG. 2 is a process model of the expert system.
Figure 3:
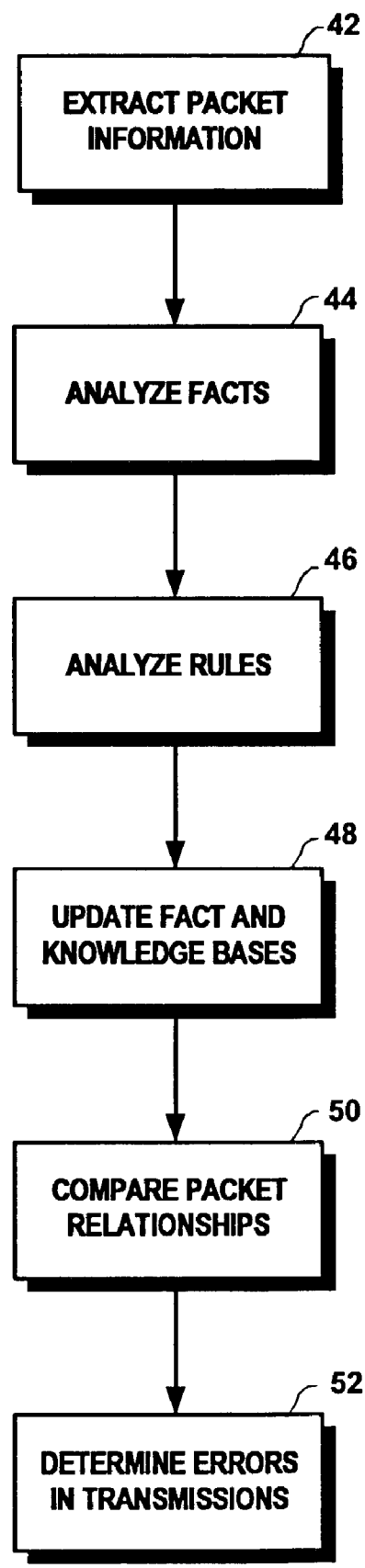
FIG. 3 is a flowchart of the process of the expert system analysis.

FIG. 2 illustrates a process model 10 of the operation of the preferred embodiment. FIG. 3 is a flowchart illustrating the steps of the expert system to determine if protocol errors occur in a data transmission. A series of packet 28 exemplify the traffic on a packet-based network 12. The process model 10 contains at least one facts database 32 and at least one rules database 34. These databases may be separated or combined together in one unit, and they are located within the analyzer system 10 or located in an external storage area. Packets 28 enter the analyzer system 10 as they are captured from network 12 or access from packet storage 20. Each packet 28 contains factual information and is constructed following protocol rules for the packet contents. Packets are parsed and analyzed by expert system 22 to extract individual packet component information 42. New fact or new rules determined from the packet information 48 are saved into the rule 34 or packet 32 databases. The rules database 34 contains programmed rules based on existing protocols as well as dynamic rules generated from the analyzed packet components. As an example, an application-specific protocol encompasses the stages of training between two modems negotiating a connection under the International Telecommunications Union ("ITU") Recommendation V.92. The protocol analysis engine 38 analyzes the rules 46 and facts 44 gained from each extracted packet components for comparison matching on individual packets and across multiple packets 50 with a protocol. Simple tests, such as matching IP addresses with Ethernet addresses, may be performed before packet extraction and not recorded as facts.

Each packet 28 is divided into multiple content sections containing bytes of information. Sections containing facts can include, for example, a routing header for Internet protocol, sequence numbers, an Ethernet header, and payload. The expert system 22 will parse bytes within a packet for the facts 42 and can record contents into the fact base 32. The system will also parse the packet and for sections of rules 34 such as application protocol headers, messages, and redundancy or parity checks, and can save this information into the rule knowledge base 34. For example, a redundancy check that is internal to the expert engine 22 and is applied to the initial packet contents can be matched with the fact that contains the redundancy check from the packet to determine the integrity of the packet. Analyses can also be completed in real time or captured data can be stored externally and the analysis performed offline. The expert system is easily extensible for addition protocols and diagnostics by updating the rule database 34 with rules designed for any application or protocol desired.

The following examples further describe the preferred embodiment as used in protocol analysis. Under ITU H.323, packets exchanged during the call setup sequence are standardized. After the initial TCP connection sequence is exchanged, a "setup" (S) message is sent to the terminating endpoint. The terminating endpoint may send a "call proceeding" message (CP) followed by an "alerting" (A) and a "connect" (C) message, after which the call is established. Further exchanges in the call include packets exchanging voice along with noise and auditory control information. A prior art expert system that only analyzes packet information against a rules table or database would not know if, for example, voice packets are being sent to an incorrect port, because there are no functional relationships between the packets themselves and the dynamic rules of the H.323 call session. The exemplary expert system analyzes whether the H.323 protocol flow is correct or erroneous and can determine if packets were incorrectly addressed, incorrectly routed, or contained incorrect components. Also, CP or A messages may not be sent, but the call is still valid. If these optional messages are present, they have to be sent in the given order.

The expert system generates more than a simple packet validation, it performs a validation of the entire protocol exchange. An individual packet might be valid within the generic protocol, but at the same time be incorrect in the current protocol session. For example, an "open logical channel" message under H.323 might be legally consistent, but if the other endpoint has not advertised the capability requested, the message is still illegal. One skilled in the art can appreciate that this method is exemplary and is not limited to an H.323 session.

An additional example of the expert system is useful in a background analysis of TCP/IP network connections to verify protocols, validations, and hardware components. The expert system can easily detect a message that was sent but not received and acknowledged, without additional human interactions. A missing component in a high-level protocol exchange can be also detected by the expert system.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A method to determine errors in network protocols and transmissions, comprising:
   capturing protocol data units from a network during a protocol flow exchange;
   extracting protocol information components from said data units;
   comparing the extracted protocol information components from a plurality of data units with each other and with rules of the protocol flow exchange; and
   validating a protocol exchange according to functional relationships between an expected protocol exchange according to the rules of the protocol and the protocol information components extracted from the data units during the protocol flow exchange.

2. The method of claim 1, further comprising:
   analyzing the captured data units for protocol rules information contained in each of the data units;
   analyzing the captured data units for network transmission rules information contained in each of the data units;
   saving the protocol rules information and the network transmission rules information from the captured data units into a rules database.

3. The method of claim 1, further comprising:
   analyzing the captured data units for protocol fact information contained in each of the data units;
   analyzing the captured data units for protocol session-specific fact information contained in each of the data units;
   saving the protocol fact information and network transmission fact information from the captured data units into a fact database.

4. The method of claim 1, wherein:
   the step of comparing the extracted protocol information components comprises:
   analyzing the components from extracted data units for comparison matching on individual data units with a protocol; and
   analyzing the components from extracted data units for comparison matching across multiple data units with a protocol.

5. The method of claim 1, wherein:
   the protocol data units are packets captured from a packet-based network transmitting packets according to at least one protocol between two or more hardware units.

6. The method of claim 1, wherein the validating further comprises detecting transmission errors in a telephony call session on the network by comparing expected components of a protocol exchange according to rules for the protocol exchange during the call session with the components extracted from the data units while the protocol exchange is occurring for the call session.

7. The method of claim 1, wherein the validating comprises validating the protocol flow exchange during stages of the protocol exchange between a plurality of devices connected to the network by analyzing rules and facts gained from each protocol data unit for a functional relationship between the rules and facts and intended rules and facts at each of the stages of the protocol flow.

8. The method of claim 1, wherein the validating comprises determining a consistency of each protocol information component with dynamic rules of the protocol that are expected during a stage of a protocol flow exchange between at least two hardware devices on the network.

9. A system for detecting protocol errors in a network data transmission, comprising:
   a network interface for capturing protocol data units from a network during a protocol flow exchange into the system;
   an expert system for extracting protocol information components from said data units, comparing the extracted protocol information components from a plurality of data units with rules of the protocol flow exchange, and validating a protocol exchange according to functional relationships between an expected protocol exchange according to the rules of the protocol and the protocol information components extracted from the data units during the protocol flow exchange;
   a storage unit for storing data units captured from the network; and
   an interface to provide external access to the system.

10. The system of claim 9, further comprising:
    a rules database for saving the protocol rules information and the network transmission rules information from the captured data units after being analyzed for rules information contained in each of the extracted protocol information components.

11. The system of claim 9, further comprising:
    a fact database for saving the protocol fact information and the network transmission fact information from the captured data units after being analyzed for fact information contained in each of the extracted protocol information components during a specific protocol exchange.

12. The system of claim 9, wherein the expert system contains a protocol analysis engine for analyzing the components from extracted data units for validation of each data unit during with expected components from each data unit during a stage of a protocol flow exchange session of an application.

13. The system of claim 9, wherein the expert system further validates the protocol flow exchange during stages of the protocol exchange between a plurality of devices connected to the network by analyzing rules and facts gained from each protocol data unit for a functional relationship between the rules and facts and intended rules and facts at each of the stages of the protocol flow.

14. The system of claim 9, wherein the expert system further determines a consistency of each protocol information component with dynamic rules of the protocol that are expected during a stage of a protocol flow exchange between at least two hardware devices on the network.

15. A system for detecting protocol errors in a network data transmission, comprising:
    a network interface for transferring protocol data units from a network;
    a processor that captures protocol data units from a network during a protocol exchange session,
    extracts protocol information components from said data units, comparing the extracted protocol information components from a plurality of data units with dynamic rules of the protocol exchange session during a stage of the session, and validates a protocol exchange according to functional relationships between an expected protocol exchange according to the rules of the protocol and the protocol information components extracted from the data units during the protocol flow exchange.

16. The system of claim 15, wherein the processor further validates the protocol flow exchange during stages of the protocol exchange between a plurality of devices connected to the network by analyzing rules and facts gained from each protocol data unit for a functional relationship between the rules and facts and intended rules and facts at each of the stages of the protocol flow.

17. The system of claim 15, wherein the processor further determines a consistency of each protocol information component with dynamic rules of the protocol that are expected during a stage of a protocol flow exchange between at least two hardware devices on the network.

18. An expert system for analyzing protocol data units in a network, comprising:
   a processing unit;
   a memory storage unit;
   a network interface connected to a network;
   an expert engine, in the processing unit, for capturing the data units into the expert engine during a protocol exchange, analyzing the data units for fact data, analyzing the data units for protocol rule data, evaluating relationships of facts and rules between a plurality of data units, and validating a protocol exchange according to dynamic relationships between an expected protocol exchange according to the rules of the protocol and the protocol information components extracted from the data units during the protocol flow exchange.

19. The system of claim 18, wherein the expert engine further validates the protocol flow exchange during stages of the protocol exchange between a plurality of devices connected to the network by analyzing rules and facts gained from each protocol data unit for a functional relationship between the rules and facts and intended rules and facts at each of the stages of the protocol flow.

20. The system of claim 18, wherein the expert engine further determines a consistency of each protocol information component with dynamic rules of the protocol that are expected during a stage of a protocol flow exchange between at least two hardware devices on the network.

* * * * *